United States Patent [19]

Schmidt et al.

[11] 3,975,459

[45] Aug. 17, 1976

[54] THERMOPLASTIC MOLDING COMPOSITIONS OF HIGH IMPACT RESISTANCE

[75] Inventors: Franz Schmidt, Mannheim; Gerhard Fahrbach, Plankstadt; Wolfgang Schenk, Schwetzingen; Erhard Seiler, Freiburg, all of Germany

[73] Assignee: BASF Aktiengesellschaft, Ludwigshafen (Rhine), Germany

[22] Filed: Apr. 14, 1975

[21] Appl. No.: 568,144

[30] Foreign Application Priority Data

Apr. 26, 1974 Germany............................ 2420300

[52] U.S. Cl. ............................ 260/876 B; 260/874; 260/879; 260/887

[51] Int. Cl.$^2$......................................... C08L 53/00
[58] Field of Search ......................... 260/876 B, 887

[56] References Cited
UNITED STATES PATENTS 3,655,830   4/1972   Smith................................. 260/901

*Primary Examiner*—Carman J. Seccuro
*Attorney, Agent, or Firm*—Johnston, Keil, Thompson & Shurtleff

[57] ABSTRACT

Thermoplastic molding compositions based on polyoxymethylene and containing, to improve the impact resistance, a block copolymer of a diene polymer block B and at least one poly(alkylmethacrylate) block A.

1 Claim, No Drawings

THERMOPLASTIC MOLDING COMPOSITIONS OF HIGH IMPACT RESISTANCE

This invention relates to thermoplastic molding compositions of high impact resistance based on polyoxymethylenes and block copolymers of a diene polymer block B and at least one poly(alkylmethacrylate) block A.

Polyoxymethylenes are prepared by polymerization of formaldehyde or trioxane or copolymerization of these monomers with suitable oxacrylic compounds or polyformals. They are partially crystalline plastics having a high degree of rigidity and a high tensile strength. However, shaped articles of polyoxymethylenes have a relatively low impact resistance, and this hinders the use of this plastics material in various applications.

The addition of polyhydric alcohols such as glycerol or trimethylol propane or of readily volatile substances such as trioxane or 1,4-dioxane slightly increases the impact resistance of polyoxymethylenes but also involves a sharp reduction in rigidity and tensile strength. Basically the same applies to the addition of carboxamides. Furthermore, the above substances suffer from the added drawback that they can be washed out of the shaped articles or exude therefrom. It has also been proposed to prepare thermoplastic molding compositions by blending polyoxymethylene with high molecular weight polyurethanes obtained from polyhydroxy compounds having molecular weights of from 500 to 4000, polyisocyanates and chain lengtheners. Here again, the rigidity and tensile strength suffer a strong reduction. Furthermore, the stability of the products is impaired, particularly as regards discoloration caused by thermal stresses and light. Belgian Pat. No. 703,215 recommends the addition of butadiene/acrylonitrile copolymers, polyacrylates or copolymers of diolefins with alkylmethacrylates. However, these additives also reduce the thermal stability of the molding compositions and cause discoloration during processing.

We have now found that thermoplastic molding compositions having greatly improved impact resistance and thermal stability may be obtained by blending polyoxymethylene, particularly trioxane copolymers containing oxyalkylene groups having at least 2 adjacent carbon atoms with block copolymers of a diene polymer block B and at least one poly(alkylmethacrylate) block A. In addition, the molding compositions of the invention surprisingly show no tendency to discoloration even when processed repeatedly and in spite of their content of carbon-carbon double bonds. Their thermal stability is at least equal to and in most cases superior to that of polyoxymethylene molding compositions not containing said block copolymer addition, whilst their rigidity and tensile strength suffer only a slight reduction.

Surprisingly, a distinct improvement in impact resistance is achieved with relatively small amounts of added block copolymer. In general, the amount of rubber component used is from 3 to 30 and preferably from 5 to 20%, by weight of the total mixture.

Suitable polyoxymethylene components for the preparation of the molding compositions of the invention are homopolymers of formaldehyde or of trioxane in which the end groups have been protected against degradation starting at the end of the chain by etherification or esterification. However, we prefer to use copolymers of formaldehyde or trioxane which contain in the chain, in addition to oxymethylene groups, up to 30% by weight, for example from 0.1 to 25 and in particular from 0.5 to 10% by weight, of oxyalkylene groups, for example the oxyethylene, oxybutylene or oxypropylene groups. Particularly suitable are copolymers of trioxane with ethylene oxide, 1,3-dioxolane, 1,3-dioxepane, 1,3,6-trioxocane or polyformals. The melt indices of the polyoxymethylenes used should preferably be from 1 to 40 and more preferably from 2 to 30, as determined according to ASTM 1238-52 T. In the case of high molecular weight substances, it is recommended to use branched-chain trioxane terpolymers on account of their better processability. The melting points of the polyoxymethylenes used in the invention are generally above 130°C and preferably about 150°C.

The block copolymer consists of a diene polymer block B and at least one poly(alkylmethacrylate) block A. Thus its formula is either A-B or A-B-A.

The diene polymer B may be:
A homopolymer of a diene hydrocarbon or a copolymer of different diene hydrocarbons with each other, a random copolymer of diene hydrocarbons and alkenyl aromatic hydrocarbons, a block copolymer of diene hydrocarbons and alkenyl aromatic hydrocarbons, the transitions between the individual blocks being sudden or gradual.

Suitable diene hydrocarbons are, preferably, butadiene or isoprene and suitable alkenyl aromatic hydrocarbons are styrene, α-methylstyrene and vinyl toluene. The diene polymer B should contain at least 30% and preferably more than 50% by weight of diene hydrocarbons. The molecular weight of the segment B should be from 20,000 to 1,000,000 and preferably from 50,000 to 500,000.

The poly(alkylmethacrylate) may be, for example: poly(ethylmethacrylate), poly(butylmethacrylate), poly(hexylmethacrylate) and preferably poly(methmethacrylate). The molecular weight of the segment A should be from 3000 to 500,000 and preferably from 10,000 to 100,000.

The block polymers are generally glass-clear, highly elastic and unbranched products having glass temperatures below 25°C and preferably from −95° to −25°C. Their content of diene polymer B is preferably from 30 to 90% and in particular from 60 to 80% by weight.

They may be manufactured as follows: The middle block B is first formed by homopolymerization of diene hydrocarbons or copolymerization of alkenyl aromatic hydrocarbons, the initiators used being organo-alkali metallic compounds. Following the addition of a small amount of α-methylstyrene, alkylmethacrylate is added to the living chain ends of block B and it is possible to attach one or two blocks A without producing appreciable amounts of discrete homopolymer B caused, for example, by detachment via ester groups.

Preparation of block B is carried out by polymerizing the monomers in an organic solvent free from protonic substances. Suitable solvents are aliphatic ethers (e.g. diethyl ether), aromatic/aliphatic ethers (e.g. anisol), cyclic ethers (e.g. tetrahydrofuran or dioxane), mixtures of ethers with non-polar hydrocarbons, aliphatic hydrocarbons or aromatics. The polymerization from −80° to +60°C. The initiators used are organoalkali metallic compounds in amounts of, preferably, from $5.10^{-3}$ to $10^{-4}$ moles/l. Examples of suitable initiators are monofunctional organo-alkali metallic compounds of lithium, sodium and potassium, for example n-butyllithium, cumyl sodium and cumyl potassium, bifunctional initiators such as hexamethylene dilithium-1,6 and adducts of alkali metals, preferably lithium, sodium and potassium, with α-methylstyrene, naphthalene, biphenyl, stilbene or other aromatic hydrocarbons showing a higher degree of condensation.

On completion of polymerization of block B and following the addition of a small amount (about 1.0%) of α-methylstyrene to suppress side reactions, particularly side reactions involving ester groups, during formation of segment A, alkylmethacrylates are attached to the living chain ends of block B by polymerization. The preferred alkylmethacrylates used are those having from 2 to 6 carbon atoms in the alkyl radical, particularly methacrylate. The polymerization temperature during formation of segment A is generally from −120° to +70°C and preferably from −80° to +60°C.

De-activation of the living block copolymers may be effected by the addition of protonic substances, for example carboxylic acids, such as acetic acid. Depending on the type of initiator used (monofunctional or bifunctional), there are obtained either two-block copolymers B-A or three-block copolymers A-B-A.

Incorporation of the block copolymers into the polyoxymethylene may be carried out in the usual manner in a mixing mill or in an extruder such as a twin-worm extruder. Suitable temperatures for such incorporation are from 170° to 240°C and preferably from 180° to 220°C. It is an important prerequisite for achieving the effects of the invention that the rubber phase be distributed in the polyoxymethylene as uniformly as possible, and it is therefore preferred to use twin worms having a good mixing effect and, if necessary, a kneading action. The rubber is preferably metered in the form of fine lumps together with polyoxymethylene powder or granules. Satisfactory results are also obtained by blending with 10 to 15% solutions of the three-block copolymer in toluene, followed by evaporation of the solvent and the formation of granules.

The molding compositions of the invention are advantageously protected from degradation with the antioxidants and heat stabilizers conventionally used in polyoxymethylene. In addition, light stabilizers, dyes, fillers, pigments or glass fibers may be incorporated in the molding composition.

Preparation of block copolymers of diene polymer and poly(alkylmethacrylate)

A. 6 liters of tetrahydrofuran, distilled over tetrameric α-methylstyrene disodium, are placed in a 10 l stirred autoclave. 50 ml of a 0.5 molar solution of tetrameric α-methylstyrene dipotassium in tetrahydrofuran are then added and the mixture is boiled to about 0°C.

1650 g of butadiene, which has been freed from protonic impurities by distillation over n-butyllithium solution, are slowly added in such a manner that the internal temperature does not exceed +50°C. After about 30 minutes, a small sample is taken. The viscosity measured is equivalent to a molecular weight of $M_v$ 100,000.

To this "living" polybutadiene solution there are added 15 ml of α-methylstyrene and the whole is cooled to about −10°C. The molecular weight of the polymer is not appreciably changed thereby.

After 15 minutes, 250 g of methylmethacrylate (MMA) are added to −10°C in such a manner that the internal temperature is kept below 0°C. 30 minutes after all of the MMA has been added, polymerization is stopped by the addition of a few drops of methanol/acetic acid. The viscosity of a 0.5% solution in toluene at 25°C is 96 cm$^3$/g. The content of MMA in the three-block copolymer formed is 20% by weight. The block copolymer contains less than 10% by weight of discrete homopolybutadiene. The 1,2-content of the polybutadiene segment is from 55 to 60%, this being equivalent to a glass temperature of about −55°C.

B. Butadiene/methylmethacrylate two-block copolymers are prepared in non-polar solvents using n-butyllithium as initiator according to processes described, for example, in French Pat. No. 1,172,321, Belgian Pat. No. 558,911 or German Published Application No. 1,144,484.

The resulting butadiene/MMA block copolymers contain large amounts of homopolybutadiene. On account of side reactions involving the ester group of MMA, crosslinked products are frequently obtained. However, a nearly gel-free block copolymer is obtained if polar solvents are added prior to the MMA polymerization.

5 l of toluene, distilled over n-butyllithium, are placed in a 10 l stirred autoclave. 1000 g of butadiene are added. Polymerization is initiated by the addition of 80 ml of a 1.5% solution of n-butyllithium in toluene and is stopped after 2 hours at −60°C.

The molecular weight $M_v$ of the polybutadiene is about 120,000.

The "living" polybutadiene solution is cooled to a temperature of −40°C. 1000 ml of tetrahydrofuran, distilled over tetrameric α-methylstyrene disodium, are then added followed immediately by 300 g of methylmethacrylate. After 1 hour, polymerization is stopped by the addition of methanol/acetic acid. The molecular weight is found to be about 250,000. The disproportional increase in the molecular weight is due to coupling and branching reactions. The content of homopolybutadiene is 38% by weight and that of methylmethacrylate is about 25% by weight. The glass temperature is lower than that of the block copolymer prepared as described under (A) above (i.e. about −90°C), since the 1,2-content of the polybutadiene segment is about 12%.

Preparation of molding compositions of the invention

EXAMPLE 1

97 parts by weight of an oxymethylene copolymer which has been produced by cationically initiated polymerization of 97% by weight of trioxane with 3% by weight of 1,3-dioxolane (percentages based on the total mixture) are mixed with 3 parts by weight of a block copolymer prepared in a manner similar to that described under (A) above and based on polybutadiene and poly(methylmethacrylate) having a molecular weight of about 100,000 and a content of methylmethacrylate of 30% by weight, together with 0.4% by weight, based on the oxymethylene copolymer, of a condensate of isophthalic diamide, ethylene urea and formaldehyde and 0.5% by weight of 2,2'-methylene-bis-(4-methyl-6-t-butylphenol) in a twin-worm welding extruder at 200°C to form granules. The colorless product showing no kind of discoloration has a melt index of 5.63 as measured according to ASTM 1238-52 T and shows a loss weight of 0.13% by weight of its original weight (about 1 g) following a residence time of 2 hours at 222°C under a blanket of nitrogen. The result of this test is referred to below as WL-N$_2$.

The material is similarly tested in an atmosphere of air. The granules show a weight loss of 1.32% by weight. Hereinafter, the result of this test is referred to as WL-A.

Colorless oxymethylene copolymer prepared in the same way but without the addition of the three-block copolymer has a melt index of 6.00 and the following stability data: WL-$N_2$ = 0.39% w/w; WL-A = 2.80% w/w.

The impact resistance of the molding compositions is determined using injection-molded round discs (plastics temperature 200°C, mold temperature 110°C) having a diameter of 60 mm and a thickness of 1 mm, the test being carried out by the dart drop method. A horizontal steel plate (thickness 10 mm) having a bore of 30 mm in diameter is provided with guide strips on its top surface such that a round disc having a diameter of 60 mm can be placed concentrically over the bore. A weighted dart having a point in the form of a hemisphere having a radius of 10 mm is guided by a structure allowing it to fall freely to the center of the round disc from a height of 100 cm. Different impact resistances are determined by varying the weighting of the dart. The impact energies (cm kg) given in the Examples are those obtained when 5 out of 10 discs break under the impact of the dart.

In this test, the above molding composition has an impact resistance of 7.19 cm kg, whilst the oxymethylene copolymer not containing the rubber additive has an impact resistance of less than 1.0 cm kg.

EXAMPLE 2

Example 1 is repeated except that the rubber ingredient is the block copolymer prepared as described under (A) above and having a content of methylmethacrylate of 20% by weight.

The completely colorless molding compositions having a melt index of 6.00 has the following stability data: WL-$N_2$ 0.08% w/w, WL-A 1.48% w/w. The impact resistance is found to be 4.50 cm.kg.

EXAMPLE 3

In a manner similar to that described in Example 1, 95 parts by weight of a trioxane copolymer containing 3.8% by weight of 1,3-dioxepane and stabilized as in Example 1 are mixed, in the form of granules, with 5 parts by weight of the block copolymer used in Example 1 having a content of MMA of 30% by weight, to form granules.

The completely colorless molding composition having a melt index of 8.68 has the following stability data: WL-$N_2$ 0.16% w/w, WL-A 1.47% w/w, the impact resistance being 13.1 cm.kg.

Trioxane copolymer extruded alone and having a melt index of 9.20 gives the following data: WL-$N_2$ 0.30% w/w, WL-A, 1.80% w/w, impact resistance 1.2 cm.kg.

EXAMPLE 4

Example 3 is repeated except that 90 parts by weight of the trioxane copolymer used in Example 3 are mixed with 10 parts by weight of the block copolymer used in Example 1.

The completely colorless molding composition has a melt index of 7.32 and the following stability data: WL-$N_2$ 0.18% w/w, WL-A 1.55% w/w, the impact resistance being 19.6 cm.kg.

EXAMPLE 5

Example 3 is repeated except that 90 parts by weight of the trioxane copolymer are blended with 10 parts by weight of the block copolymer used in Example 2.

The completely colorless molding composition having a melt index of 7.05 has the following stability data: WL-$N_2$ 0.12% w/w, WL-A 1.72% w/w. The impact resistance is 21.7 cm.kg.

EXAMPLE 6

Example 3 is repeated except that 90 parts by weight of the trioxane copolymer are blended with 10 parts by weight of the block copolymer prepared as described under (B) above.

The colorless molding composition has a melt index of 7.20 and the following stability data: WL-$N_2$ 0.28% w/w, WL-A 1.85% w/w. The impact resistance is 18.5 cm.kg.

We claim:
1. Impact-resistant thermoplastic molding compositions containing
   from 70 to 97% by weight of a polyoxymethylene and
   from 30 to 3% by weight of a block copolymer of a diene polymer block B and at least one poly(alkylmethacrylate) block A.

* * * * *